Figure 1:
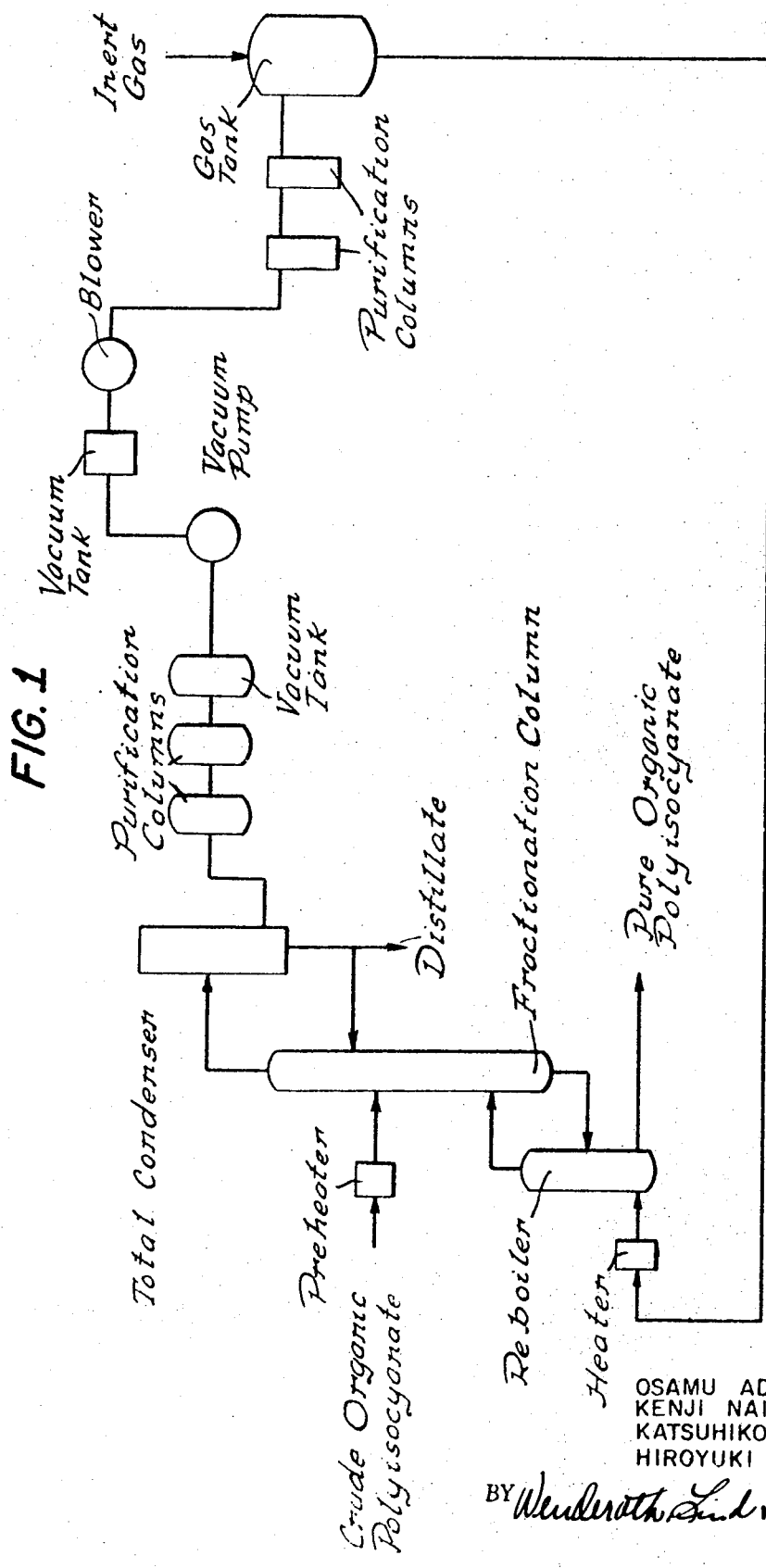

United States Patent

Adica et al.

[15] 3,658,656
[45] Apr. 25, 1972

[54] PURIFICATION OF XYLYLENE ORGANIC DIISOCYANATE BY FRACTIONAL DISTILLATION IN THE PRESENCE OF AN INERT GAS OR SUPERHEATED VAPOR OF AN ORGANIC SOLVENT

[72] Inventors: Osamu Adica; Kenji Naito, both of Toyonaka; Katsuhiko Ogino, Minoo; Hiroyuki Kuroda, Suita, all of Japan

[73] Assignee: Takeda Chemical Industries, Ltd., Osaka, Japan

[ * ] Notice: The portion of the term of this patent subsequent to Dec. 22, 1987, has been disclaimed.

[22] Filed: Nov. 7, 1968

[21] Appl. No.: 774,195

Related U.S. Application Data

[63] Continuation-in-part of Ser. No. 636,353, May 5, 1967, Pat. No. 3,549,504.

[52] U.S. Cl..................................203/49, 203/67, 203/68, 203/69, 203/70, 203/80, 203/87, 203/91, 260/453 SP

[51] Int. Cl. .........................................B01d 3/34, C07c 69/00
[58] Field of Search.............................203/49, 1-3, 68-70, 203/92, 95-97, 91, 87, 80; 260/453 A

[56] References Cited

UNITED STATES PATENTS

| | | | |
|---|---|---|---|
| 3,211,631 | 10/1965 | Fuchs | 260/453 |
| 3,317,606 | 5/1967 | Luberoff et al. | 260/453 |
| 3,549,504 | 12/1970 | Adica et al. | 203/49 |

Primary Examiner—Wilbur L. Bascomb, Jr.
Attorney—Wenderoth, Lind & Ponack

[57] ABSTRACT

Crude organic polyisocyanate is fractionated at a low temperature in the fractionation column, in the presence, in the fractionation column, of an inert gas (nitrogen gas, natural gas, carbon dioxide gas) and purified organic polyisocyanate is obtained in a high yield.

In one important aspect, crude xylylenediisocyanate is fractionated in the presence of an organic solvent having a boiling point of −20° to 150° C. at the pressure of 200 mmHg in the fractionation column under low temperature, whereby purified xylylenediisocyanate is obtained in a high yield.

4 Claims, 2 Drawing Figures

INVENTORS
OSAMU ADICA
KENJI NAITO
KATSUHIKO OGINO
HIROYUKI KURODA

BY Wenderoth, Lind & Ponack
ATTORNEYS

PURIFICATION OF XYLYLENE ORGANIC DIISOCYANATE BY FRACTIONAL DISTILLATION IN THE PRESENCE OF AN INERT GAS OR SUPERHEATED VAPOR OF AN ORGANIC SOLVENT

This application is a continuation-in-part of U.S. application Ser. No. 636,353, filed May 5, 1967 now U.S. Pat. No. 3,549,504.

This invention relates to a method for the purification of crude organic polyisocyanates.

More specifically the invention relates to a method for purification of crude organic polyisocyanates by subjecting it to a fractionation under specifically defined conditions, whereby light or residual impurities are cut.

An organic polyisocyanate, when produced by reacting the corresponding amine with phosgene, inevitably contains various by-products having relatively low boiling points. This makes it necessary to submit the product mixture to a further purification process. Organic polyisocyanates, as is well known, have relatively high boiling points and are very unstable when heated. Heretofore, for the purpose of purifying the materials having high boiling point and which are susceptible to deterioration upon heating, a vacuum distillation method has usually been employed. However, in this method, the material to be purified is eventually subjected to a comparatively high temperature due to a remarkable rising of temperature necessarily caused around the bottom of distillation column by pressure drop. Therefore, organic polyisocyanates can not be safely purified by this method.

To solve this problem, various attempts to minimize the pressure drop in the distillation column have been made. For example, there has been the employment of various types of trays such as Ballast tray, Ripple tray, Venturi Caskade tray, or improvement or developments of the various materials to be packed in the column such as MacMahon. However, control of pressure drop cannot be satisfactorily attained by these means.

Recently, vacuum fractionating apparatus such as spinning Band Still, Brush Still, Rotary Column and Luwa fractionator or falling film type fractionation column have been developed for the purpose of attaining effective control of the pressure drop. But these apparatuses also have not given satisfactory results since the mechanically complicated design of such apparatuses are not suitable for fractionation on a commercial scale.

The present invention is based upon the discovery that purification by fractionation of crude organic polyisocyanates can easily be effected at a low temperature with a conventional fractionation column such as tray column or packed column by selecting specific fractionation conditions.

The present method comprises subjecting the crude organic polyisocyanate including light impurities to fractionation by allowing the crude organic polyisocyanate to contact an inert gas in a fractionation column under such conditions that the pressure at the top of the fractionation column is lower than 200 mm. Hg, and the feed rate (C) of inert gas is $$C = (R)(P)\frac{P_B - P_x}{P_x} \frac{f}{g} \text{ (mol./hr.)} \quad (I)$$

wherein the value of $$\frac{P_x E_v}{P_B} \frac{f}{g}$$

ranges from 0.05 to 0.50, the value of $E_v$ ranges from 0.3 to 1.0 and the value of $\frac{f}{g}$ ranges from 0.2 to 20.

$$R = \frac{\left(\frac{X_p - Y_f}{X_p - X_f}\right)}{1 - \left(\frac{X_p - Y_f}{X_p - X_f}\right)} \quad (II)$$

$$P = \frac{FX_f - WX_w}{X_p} \text{ (mol./hr.)} \quad (III)$$

and wherein $P_B$ = operating pressure at the bottom of column (mm. Hg).

$P_x$ = equilibrium vapor pressure of residue at bottom of column at the operating temperature.

$X_p$ = molar concentration of light components in reflux fluid (mol fraction).

$X_f$ = molar concentration of light components in crude organic polyisocyanate (mol fraction).

$Y_f$ = molar concentration of light components contained in equilibrium vapor of crude organic polyisocyanate in feed tray at the operating temperature (mol fraction).

$F$ = feed rate of crude organic polyisocyanate (mol/hr).

$W$ = transfer rate of residue (mol/hr.).

$X_w$ = molar concentration of light components in residue (mol fraction).

$\frac{f}{g}$ = parameter determined by properties of a crude organic polyisocyanate and construction of the fractionation apparatus.

$E_v$ = vaporization efficiency.

According to the present invention, a pressure drop at the bottom of the fractionation column can effectively be improved. Therefore, by this invention crude organic polyisocyanate can easily and sufficiently be purified by fractionation using simple apparatus such as tray column and packed column accompanied by no degradation of polyisocyanate due to heating.

The object of the present invention is to provide a novel method for purification by a fractionation of crude organic polyisocyanate containing light impurities.

Another object of the invention is to provide pure organic polyisocyanate substantially free from light impurities from corresponding crude organic polyisocyanate in a high yield by a simple procedure using a simple and available apparatus.

The organic polyisocyanates to be treated by the present method, are exemplified by crude xylylenediisocyanate

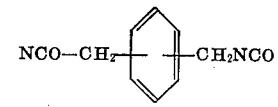

meta-, para, ortho or mixtures thereof), hexamethylenediisocyanate, 4,4'-diphenylmethane diisocyanate, tolylenediisocyanate (2,4-isomer, 2,6-isomer, or mixture thereof), toluene-2,4,6-triisocyanate. Such polyisocyanates are obtained by phosgenation of the corresponding diamines in the conventional manner.

The crude organic polyisocyanates may be treated by the present method in the form of the phosgenation products without any preparatory treatment. However, it is desirable that before being treated by the present method, the crude organic polyisocyanates be subjected to a simple distillation in a conventional manner so as to remove high-boiling constituents therefrom.

As inert gases, there are used, for example, nitrogen gas, air, natural gas, carbon dioxide gas and an inert gas mainly consisting of nitrogen, which is obtained by combustion of hydrocarbon. There can also be employed any other gases so long as they are inert with respect to, i.e. do not react with, the organic polyisocyanate.

In the present method, either batch-wise or continuous process may be employed, though the latter is desirable, and any conventional fractionating apparatus may be used. Such apparatus is exemplified by tray column, such as Babble cap tray column, Sieve tray column, Ballast tray column, Ripple tray column, Jet tray column; or packed column packed with MacMahon, Pall ring and Raschig ring, etc.

The following description is limited to the aspect where light component is cut as impurity. However, as a matter of course, the following method may be applied to the case wherein high-boiling constituent is cut as impurity.

In the method of the present invention the crude organic polyisocyanate to be purified and inert gas are introduced into a fractionation column and allowed to intimately contact with each other under conditions of heating. The pressure at the top of the fractionation column and the feed rate of the inert gas are specifically determined. First of all, the pressure at the top of the fractionation column is selected from a range of about 5 to about 200 mm Hg., more preferably, 20 to 150 mmHg. And the feed rate of the inert gas is determined by the above equations (I) to (III) in the following manner.

First, the composition of the organic polyisocyanate to be purified is determined. When the organic polyisocyanate is determined, operating temperature may be suitably determined in accordance with the stability to heating of the particular organic polyisocyanate. Generally, this temperature will be selected in the range of 90° to 220° C. For example, when crude TDI is purified, the temperature may be from 100° to 190° C.; when crude XDI is used the range may be from 100° to 185° C., but is preferably from 100° to 170° C.; and when crude MDI is used it may be from 100° to 210° C.

The amount and the desired purity of the purified organic polyisocyanate are suitably determined in respective cases. Generally, the desired purity will range from 98 to 100 percent.

The value of $P_B$ as mentioned above is determined within a range of about 5 to about 200 mmHg., more preferably 50 to 200 mmHg.

The value of $F$ is determined in accordance with the necessary amount of purified organic polyisocyanate.

The value of $P_x$ is calculated from the purity of desired organic polyisocyanate and operating temperature, since the purified organic polyisocyanate obtainable by the present method substantially corresponds to volatile components of the mixture accumulated at the bottom of the column.

The value of $X_p$ is previously hypothetically determined taking into account the type of fractionation column, etc., and after a trial with the use of this hypothetical value is carried out, any necessary correction is made. The value of $X_p$ is a molar fraction of impurities to be cut from the top of the column, which are contained in the reflux fluid, and it is desirable to make the value as high as possible. Generally, the value of $X_p$ ranges from 0.4 to 0.9.

The value of $X_f$ can be found by an analysis of molar concentration of impurities contained in the crude organic polyisocyanate to be purified.

The value of $Y_f$ is determined from vapor-liquid equilibrium data of a two-component system consisting of impurity and organic polyisocyanate.

As the residue is the purified organic polyisocyanate, the value of $W$ shows a transfer rate of purified organic polyisocyanate recovered from the bottom of the column.

The value of $X_w$ shows molar concentration of impurities in purified organic polyisocyanate and can be determined from the purity of desired organic polyisocyanate.

The values of $\oint$ and $E_r$ are suitably determined within a range of about 0.2 to about 20 and about 0.3 to about 1.0, respectively.

Further, the value of $(P_rE_r/P_B)$ is controlled within a range of about 0.05 to about 0.50 by suitably selecting the value of $P_B$ within the range of 5 to 200 mmHg.

By the use of the thus-determined values, the value of $C$ which is the feed rate of inert gas is calculated from equation (I) $$\left(C = (R)(P)\frac{P_B - P_x}{P_x}\oint\right)$$

together with the equations (II) and (III).

Necessary correction of the value of $C$ so calculated may be effected after one or more trials with the use of the calculated value.

In this manner the value of $C$ actually applicable is finally determined.

The fractionation of the present method is conducted under thus determined operation conditions.

For controlling the operating conditions (i.e. pressure at the bottom of the column, feed rate of inert gas, etc.) to previously determined values, any conventional means may be applied. Such means are known in the art.

Further for a better understanding of this invention, the operation process of the present method is explained referring to the drawing.

FIG. 1 is an example of a flow sheet of the continuous apparatus employable in the present method. In FIG. 1, crude organic polyisocyanate (hereinafter referred to as PI) is led to Fractionation Column (C) through Preheater (D). An inert gas (hereinafter referred to as IG) being heated in Heater (A) is led to Reboiler (B) from Gas-Tank (L) and then to Fractionation Column (C) and flows upward with vapor of PI and impurities, in the Fractionation Column (C). In Fractionation Column (C), crude PI is separated into light impurities and pure PI. Thus-separated light impurities are concentrated at the top of the column, and then condensed at Total Condenser (E), while pure PI is led to Reboiler (B). A part of the condensate in Total Condenser (E) is returned to the Fractionation Column (C) as reflux fluid and the other is drawn off as Distillate (DL). The inert gas not condensed in Total Condenser (E), is sucked by Vacuum Pump (I) through Purification Column (F) and (G) and Vacuum Tank (H), and is collected in Vacuum Tank (M) and then returned to the Gas Tank (L) through Blower (N) and Purification Column (J) and (K). Purified PI is drawn off as Residue (BL) from Reboiler (B).

In the following examples of the present invention, "parts" is by weight, unless otherwise stated.

EXAMPLE 1

200 Parts of phosgene dissolved in 200 parts of o-dichlorobenzene at −5° C, is mixed with 68 parts of a mixture of 30 parts of p-xylenediamine and 70 parts of m-xylenediamine dissolved in 400 parts of o-dichlorobenzene. The mixture is gradually heated to 170° C. for 2 hours while introducing an excess amount of phosgene to allow a reaction to take place. After the reaction, nitrogen gas is introduced into the resultant mixture to remove the excess phosgene. Then the solvent is distilled off from the treated resultant mixture to give a crude mixture of p-xylylenediisocyanate and m-xylylenediisocyanate (referred to as XDI), which includes 3.5 parts of impurities and high-boiler. The crude XDI is subjected to simple distillation under a condition of 135° – 140° C./3 mmHg. to cut the high-boiler.

Thus treated crude XDI is fractionated utilizing a system as described in FIG. 1 and using nitrogen as inert gas.

The type of each of the apparatuses used is as follows:
Fractionation Column: glass column packed with stainless steel;
MacMahon (length: 2,000 mm, inner diameter: 50 mm);
Preheater: falling film type heater;
Reboiler: Jacketted vessel with gas feed ring (capacity about 2 liters);
Heater: Plate fin type heater;
Partial Condenser: shell and tube type;
Total Condenser: shell and tube type.

As inert gas, nitrogen gas is used.

The feed rate of nitrogen gas is determined as follows:

First, the operating temperature, that is to say, the temperature of the bottom of the column is adjusted to about 160° C. This temperature is used since m-XDI is caused to be polymerized polymerized by heating at a temperature higher than 185° C. The feed rate of crude XDI, $F$, is determined at a rate of 1,100 parts per hour. The operating pressure at the top of the column is determined as 30 mm. Hg taking into account the construction of the column.

Considering thus determined operating pressure at the top and pressure drop occurring in the column, the pressure at the bottom of the column $P_B$ is estimated as about 45 mmHg. The purity of desired XDI is determined as 99.8 percent. From the purity of desired XDI and the operating temperature, the value of $P_x$ is calculated as 10 mmHg. The value of $X_p$ is tentatively determined as 0.80. The value of $X_f$ is found to be 0.02. The value of $W$ is approximately equal to the value of $F$ since the value of $W$ represents the transfer rate of purified organic polyisocyanate as previously described. In the calculation, the value of $X_{tr}$ can be taken as being 0. The value of $E_t$ is 0.60. The value of $Y_f$ is determined as 0.05. From thus determined value, $R$ is calculated by the equation (II);

$$R = 25$$

$P$ is calculated by the equation (III);

$$P = 0.147 \text{ mol/hr}$$

and, $C$ is calculated by the equation (I);

$$C = 25 \times 0.147 \times \frac{45-10}{10} \times 1.38 = 17.8 \text{ mol./hr.}$$

$$= 395 \text{ parts by volume/hr.}$$

wherein 1.38 is a parameter experimentally determined depending upon properties of crude XDI and the structure of the column. Thus, the feed rate of nitrogen gas actually applied is determined as about 400 parts by volume per hour. The values obtained in the calculations are utilized in the operation within a tolerance of 10 percent. Actual operation is carried out by applying thus obtained values as follows:

The crude XDI is heated in the preheater at 155° C. and is fed into the column from the middle part thereof at a rate of 1,000 parts/hr. The nitrogen gas is heated in preheater at 160° C. and is blown into the reboiler at a rate of 400 parts by volume/hr. at normal pressure and temperature. The column is maintained at an operating pressure of 30 mmHg. at the top. The temperature of reboiler is set at 162° C. The temperature at the top of the column is maintained at 130° C. after a stationary state is attained. The reflux ratio is 9.0. The fractionation is carried out continuously for 20 hours, during which period 950 – 1,000 parts per hour of residue is continuously taken out from the Reboiler. Distillate and residue at a stationary state is analyzed by gas chromatography to show the following results:

| XDI (weight %) | | *Impurities (weight %) |
|---|---|---|
| Residue | 99.94 | 0.06 |
| Distillate | 28.8 | 71.2 |

*Impurities mainly consisting of chloromethyl benzyl isocyanate.

Thus produced residue is subjected to a simple distillation under conditions of 130° – 170° C./ 1 mmHg. to give purified XDI of a purity of 99.9 percent in a yield of 93 parts relative to crude XDI charged.

EXAMPLE 2

The fractionation of crude diphenylmethane—4.4'—diisocyanate (referred to as 4,4'-MDI) is carried out by the use of the same apparatus as in Example 1.

4,4'-MDI is produced by phosgenating diphenylmethane-4,4'-diamine (referred to as 4,4'-MDA). This crude MDI includes about 2 parts of impurities per 100 parts of crude MDI (mainly consisting of diphenylmethane-2,4'-diamine).

As the inert gas, nitrogen gas is used. Nitrogen gas feed rate is determined in the same manner as in Example 1.

Actual operation is carried out as follows:

4,4'-MDI (2,4'-MDI content 2 parts) maintained at 60° C. is fed into a preheater to be preheated to 195° C., and is led to a preheated fractionation column from the middle part thereof at a rate of 600 parts per hour. Nitrogen gas having been preheated to 250° C. in a preheater is led to the fractionation column through a Reboiler at normal pressure and temperature at a rate of 350 parts by volume/hr. The column is maintained at an operating pressure of 20 mmHg. at the top. The temperature of the column is maintained at 172° C. at the top after a stationary state is attained. The reflux ratio is 5.0. The fractionation is carried out continuously for 15 hours during which period 500 – 530 parts per hour of the residue is continuously taken out from the reboiler.

After a stationary state is attained, distillate and residue are analyzed by gas chromatography, the result of which is as follows:

| 2,4'-MDI (weight %) | |
|---|---|
| Residue | 0.3 |
| Distillate | 60 |

The thus produced residue is subjected to a simple distillation under conditions of 180° – 190° C./0.5 – 1 mmHg. to give purified 4,4'-MDI of purity of 99.7 percent in a yield of 94 percent (w/w) relative to crude MDI charged.

EXAMPLE 3

Crude XDI produced by the same procedure as in Example 1 is fractionated as follows:

The apparatus is the same as in Example 1. A inert gas, propane gas is used. The propane gas (purity: higher than 98 percent) feed rate is determined by the same manner as in Example 1. The crude XDI (Impurities content: 2 percent) is preheated at 155° C. in a preheater and is led to the fractionation column from the middle part of column at a rate of 900 parts/hr. The propane gas is heated in the preheater to 160° C. and blown into fractionation column at normal pressure and temperature at the rate of 658 parts by volume/hr.

The column is maintained at an operating pressure of 30 mmHg. at the top. The temperature of the column is maintained at 140° C. at the top by setting the temperature of a Reboiler at 162° C.

Analysis by gas chromatography of distillate and residue after the system becomes stationary:

| XDI (weight %) | | *Impurities (weight %) |
|---|---|---|
| Residue | 99.8 | 0.2 |
| Distillate | 15.0 | 85.0 |

*Impurities consisting mainly of chloromethyl benzyl isocyanate.

The simple distillation of the residue gives purified XDI of a purity of 99.7 percent in a yield of 94 percent (w/w) relative to crude XDI charged.

EXAMPLE 4

Hexamethylene diisocyanate (HMDI) is produced by phosgenating hexamethylene diamine. The thus prepared crude HMDI includes about 6 percent of impurities (mainly 1-chloro-6-isocyanato-hexane). The boiling point of the impurities is slightly lower than that (127° C./10 mmHg) of HMDI.

Thus prepared crude HMDI is fractionated by the use of the same apparatus as in Example 1. As inert gas, nitrogen gas is used. Nitrogen gas feed rate is determined by the same manner as in Example 1. The crude HMDI is heated to 145° C. in a preheater and supplied to the fractionation column from the central part at a rate of 750 parts per hour. Nitrogen gas is heated to 150° C. in a preheater and blown into a fractionation column at a rate of 295 parts by volume per hour.

The operating pressure is 50 mmHg. at the top of the column. The operating temperature is set at 150° C. in the Reboiler, whereby the temperature at the top of the column is maintained at 130° C. The reflux ratio is 10.0. The fractionation is carried out continuously for 20 hours during which period 500 – 530 parts per hour of the residue are continuously taken out from the reboiler.

Analysis by gas chromatography of distillate and residue at a stationary state of the system is as follows:

| HMDI (weight %) | | Impurities (weight %) |
|---|---|---|
| Residue | 99.6 | 0.4 |
| Distillate | 15.0 | 85.0 |

The simple distillation of the residue gives purified HMDI of purity of 99.5 percent in a yield of 91 percent (w/w) relative to crude HMDI charged.

EXAMPLE 5

Tolylenediamine is phosgenated in the presence of o-dichlorobenzene. After the reaction, o-dichlorobenzene is distilled off to give tolylenediisocyanate (TDI) consisting of 80 parts of 2,4-tolylenediisocyanate and 20 parts of 2,6-tolylenediisocyanate. Thus prepared crude TDI includes o-dichlorobenzene, light impurities such as phenyldiisocyanate and tolylisocyanate and other unknown components. Content of the light impurities is about 3 parts relative to TDI and that of unknown impurities about 18 parts. The crude TDI is submitted to batch-wise fractionation to cut light impurities and to cut high-boiler as distillation residue.

Thus treated TDI is fractionated in a stainless steel sieve tray column having 20 trays (length 2.2m, inner diameter 180 mm), at the bottom of which a Reboiler having Jacket (capacity 40 L) is equipped. As the inert gas, carbon dioxide is employed. Feed rate of carbon dioxide is determined by the same manner as in Example 1. Into Reboiler, 30 parts of the above mentioned crude TDI is charged. Carbon dioxide is blown into Reboiler at a rate of 6.3 parts by volume per hour. The pressure is controlled to 40 mmHg. at the top of column and temperature of Reboiler is controlled to 130° C. The fractionation is, at first, carried out under total reflux until the temperature of the top of column becomes constant, and is then carried out under reflux ratio of 10 : 1 to cut light impurities. After the light impurities are almost completely distilled off, pure TDI begins to distill out from the top of the column accompanied with a gradual rising of temperature at the top. Soon after the distillation of TDI begins, the reflux ratio is gradually lowered to about 1 : 1, under which conditions the distillation is further continued. When the distillation of TDI is almost completed, the reflux ratio is raised to about 4:1 to avoid a distillation of residue.

The distillation mentioned as above for totally 16 hours gives 21 parts of TDI (purity: 99.9 percent).

EXAMPLE 6

Toluene-2,4,6-triisocyanate (referred to as TTI) is produced by phosgenating 2,4,6-triaminotoluene in the presence of o-dichlorobenzene. This crude TTI includes some light impurities and high-boiler impurities. TTI has a high boiling point and is susceptible to heating. The fractionation is carried out after similar manner to Example 5. As the inert gas, nitrogen gas is used. The apparatus employed is a glass column (800 mm height) packed with one-quarter inch MacMahon up to a height of 750 mm at the upper part of which is equipped a reflux controller. 300 parts of crude TTI are fed into the column and heated at 170° C. The operating pressure is 30 mmHg. at the top of the column. The nitrogen gas is blown at a rate of 100 parts by volumne per hour. Hot water at 65° C. is circulated in the Reflux Condenser. The reflux ratio is adjusted to about 10:1. Under these conditions the fractionation is carried out, while a part of distillate is taken out to be analyzed by gas chromatography. After the amount of impurities contained in the distillate is found to be lowered, distillate is taken out of the system as purified TTI while gradually lowering the reflux ratio to about 1:1. Thus 65 parts of purified TTI (purity: 99 percent) are obtained.

In a further and particularly important aspect, this invention relates to a method for the purification of crude xylylenediisocyanate (hereinafter referred to as XDI).

More specifically, this aspect of the invention relates to a method for purification of crude XDI by subjecting to fractionation under specification conditions.

XDI has a formula of

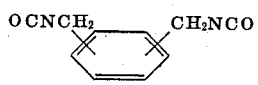

and is generally produced by reacting the corresponding xylylene-diamine with phosgene. Since various by-products, such as chlorine compounds represented by the following formulae (I) to (III) (hereinafter referred to as impurity (I), (II) and (III)

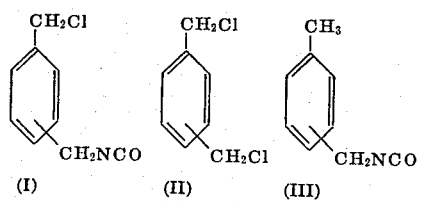

are produced in this reaction, the thus obtained crude XDI must be submitted to a process of purification.

XDI is well known in the art and is useful as a chain extender in the production of polyurethane foams, a well known and commercially valuable polymeric material.

XDI, as is well known, has a high boiling point (161° C. at 10 mm. Hg.) and is so unstable to heating that it is polymerized by heating to temperatures higher than 170° C., especially at temperatures higher than 185° C., for extended periods of time, with the result that the final yield of XDI is lowered.

In purifying the crude XDI, therefore, the most important problem to be solved is how to eliminate effectively the impurities (I) to (III), and especially impurity (I).

Heretofore, for the purpose of removing these impurities, a vacuum distillation method has been applied. In this method, however, the objective compound to be purified is eventually subjected to a comparatively high temperature since a remarkable raising of temperature due to pressure drop inevitably occurs near the bottom of a distillation column. In other words, in this method, the employment of a fractionation column having several trays is required because of the little difference in boiling points between the impurities and XDI. Incidentally, the pressure drop amounts to considerable mmHg. near the bottom of the column, whereby XDI is subjected to heating at about 180°-200° C.

Therefore, by this method, XDI cannot satisfactorily be purified. For the purpose of solving this problem, many attempts to minimize the pressure drop in distillation column have been made. However, none of them has satisfactorily solved the problem.

The present invention is based on the disclosure that purification of crude XDI by fractionation can easily be completed without any bad effect on XDI itself at a low temperature with the use of hitherto-employed fractionation column such as tray column and packed column by selecting specific fractionation conditions.

The present method has been perfected on the basis of this discovery, and comprises subjecting crude XDI to fractionation by allowing the crude XDI to contact in a fractionation column with the superheated vapor of an organic solvent having a boiling point of from −20° to 150° C. at a pressure of 200 mmHg. The organic solvent is exemplified by aliphatic hydrocarbon having 2 to 11 carbon atoms, alicyclic hydrocarbon having 5 to 8 carbon atoms, aromatic hydrocarbon, halogenated aliphatic hydrocarbon having 1 to 6 carbon atoms, or halogenated benzene. The crude XDI and solvent vapor are contacted under such conditions that the pressure at the top of the column is maintained at 5 to 200 mm. Hg. and the temperature at the bottom of the column is maintained at not higher than 185° C.

According to this aspect of the present invention, the pressure drop at the bottom of fractionation column can effectively be improved, and therefore crude XDI can easily and satisfactorily be purified by fraction with the use of simple apparatus such as tray column and packed column, accompanied with no degradation of XDI itself due to the heating.

The object of the aspect of the present invention is to provide a novel method for purification by fractionation of crude XDI including impurities having boiling points extremely close to that of XDI, that is to say, to provide a novel method for eliminating these impurities as light cuts from the crude XDI.

Another object of this aspect of the invention is to provide pure XDI substantially free from impurities in a high yield by simple procedure.

In this aspect of the present invention, XDI means not only o-, m-, or p-isomer but also any of the mixtures thereof.

This aspect of the present method can thus be applied to a purification of any of the isomers of XDI in a crude state, i.e. to a purification of crude o-xylylenediisocyanate, m-xylylenediisocyanate, p-xylylenediisocyanate and mixtures thereof.

The XDI is generally obtained by phosgenation of the corresponding xylylenediamine and the phosgenation product as it is may be treated by the present method. However, it is desirable that before being treated by the present method, the crude XDI is subjected to a simple distillation by a conventional manner so as to remove high-boiler therefrom. Thus the removal of high-boilers is desirable but not essential.

As fractionation column, any conventional apparatus may be used in this method, which is exemplified by tray column such as bubble cap tray column, Ballast tray column, Ripple tray column, Jet tray column or packed column packed with MacMahon, Pall ring, Raschig ring, and so on.

As organic solvents, there may preferably be employed those which are stable and are inert with respect to XDI as well as stable to heating and which also have a boiling point of −20° to 150° C. at a pressure of 200 mm. Hg. more preferably 30° to 80° C. at a pressure of 200 mm. Hg. These are exemplified by aliphatic hydrocarbons having two to 11 carbon atoms (e.g. pentane, hexane, heptane, octane, nonane, decane, undecane, ligroin, etc.), alicyclic hydrocarbon having 5 to 8 carbon atoms (e.g. cyclohexane, methylcyclohexane, cycloheptane, cyclooctane, etc.), aromatic hydrocarbon (e.g. benzene, secondary amyl benzene, toluene, ethylbenzene, xylene, etc.) halogenated aliphatic hydrocarbons having one to six carbon atoms (e.g. chloroform, dichloromethane, 1,2-dichloroethylene, n-monochlorobutane, carbon tetrachloride, n-monochloroheptane, n-monochloroheptane, n-monochlorohexane, 1,2-dichloroethane, tetrachloroethane, etc.) or halogenated benzene (e.g. monochlorobenzene, 1,2-dichlorobenzene, 1,3-dichlorobenzene, 1,4-dichlorobenzene, etc.).

Of the above-mentioned solvents, there may be most preferably used such solvents as cyclohexane, benzene, toluene and xylene.

In accordance with the present aspect, the superheated vapor of a solvent having low boiling point is used as a substance affording a partial pressure within the fractionating column so as to lower the partial pressure of XDI, whereby the boiling point of XDI may be lowered. This arrangement not only makes it possible to eliminate the loss of yield due to the polymerization of XDI, but also helps minimize the influence of pressure drop.

In this aspect of the present method, superheated gas of the above-mentioned organic solvent or mixture is contacted with crude XDI intercurrently in the fractionation column.

Practically, the superheated gas is produced in a preheater by heating the organic solvent at a temperature less than operating temperature of the fractionation column and supplying it to a reboiler.

The above-mentioned contact in the fractionation column is carried out under such conditions that the temperature at the bottom of the column is not higher than 185° C., the lower limit being around 100° C. and a pressure at the top of the column is from 5 to 200 mm. Hg, more preferably 30 to 100 mmHg.

The operating pressure is preferably adjusted by automatic control device fixed in the fractionation system, and the operating temperature is effectively adjusted by automatic control device fixed in a reboiler. The automatic control means for this pressure and temperature control are per se known.

In the method, either batch-wise or continuous process may be employed, though the latter is desirable.

For prevention from polymerization of XDI, the fractionation is carried out in the presence of a conventional polymerization-inhibitor if necessary.

For better understanding of this aspect of the invention, reference is now made to accompanying drawings.

Figure 2:
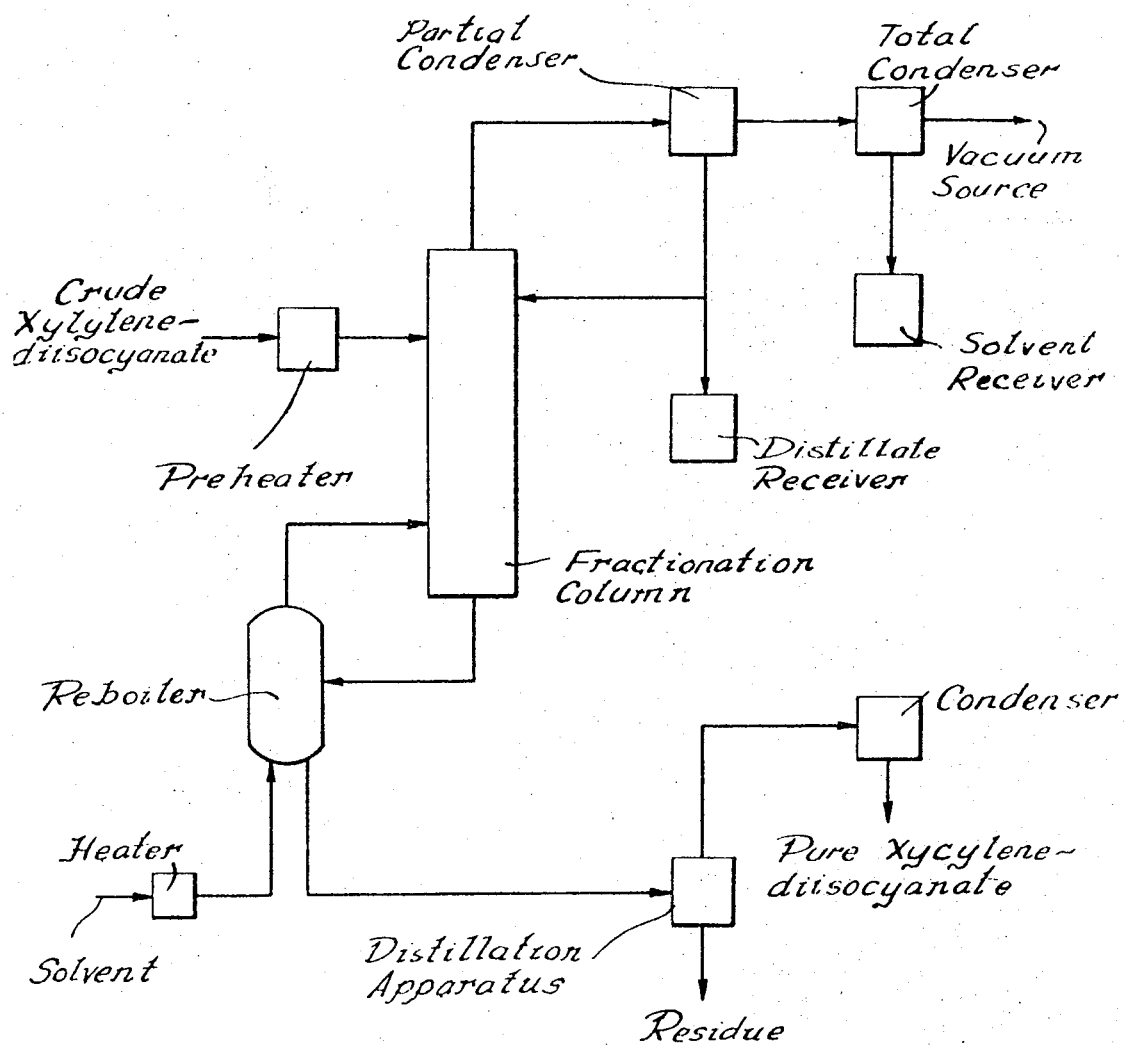

In FIG. 2, crude XDI (C-XDI) is led to fractionation column (B) through preheater (E). The superheated vapor of organic solvent, which is prepared by heating the solvent (S) in a heater (F), is led to reboiler (A) and then to fractionation column accompanying XDI vapor existing in reboiler (A). Superheated vapor of solvent flows upward with SCI vapor in the fractionation column (B). In fractionation column (B), crude XDI is separated into light impurities and pure XDI. Thus separated light impurities are concentrated at the top of column, while pure XDI is led to reboiler (A). The concentrated light impurities are led to the partial condenser (C) through the top of the column together with superheated vapor. The temperature of the partial condenser (C) must be set so as to condense only the light impurities in it. A part of the condensed light impurities is refluxed and the other collected in a distillate receiver (I). The solvent vapor separated in the partial condenser (C) is led to the total condenser (D), wherein it is collected and used repeatedly. In FIG. 2, (V) represents a vacuum source and (J) represents a solvent receiver. On the other hand, XDI collected in reboiler (A) is led to a distillation apparatus (G) to be subjected to distillation, and then thus distilled XDI is led to the condenser (H) wherein XDI is condensed. Thus pure XDI (P-XDI) is collected from the condenser (H).

Since the process of this invention is carried into practice by allowing the superheated vapor of a solvent inert to XDI to be present in the reaction zone, the partial pressure of the desired fraction, as well as the boiling point thereof, is lowered. At the same time, the influence of pressure drop may also be reduced. For example, when the partial pressure of the desired fraction accounts for 20 percent of the total pressure, the influence of pressure drop is one-fifth. In accordance with the present invention, therefore, fractional distillation is rendered possible at relatively low temperatures which do not adversely affect the XDI. Thus, the process is quite advantageous for the purification of materials having high boiling point which are lacking in thermal stability, XDI being an example of such materials.

It is necessary that the solvents to be employed in the process of this invention be inert and stable with respect to isocyanate and to heat. Since, in the equipment illustrated in FIG. 2, the solvent is separated from impurities in the partial condenser (C), it is preferable, when such an equipment is employed, that the solvent has a boiling point lower than that of said impurities by a large difference. Examples of such are given above.

The solvents which boil far below the boiling points of the above-mentioned series of solvents are difficult to be recovered in the total condenser (D).

Moreover, in respect of the attainable result of fractional distillation, the co-presence of the superheated vapor of such a solvent is not preferable, since it would disturb the equilibrium between XDI and impurities (despite the fact that a certain amount of imbalance is always inevitable) to lower the separation efficiency considerably. The preferred vacuum pressure in the fractional distillation ranges from 5 to 200 mm. Hg. Should the pressure fall short of the above range, the cost of evacuation would be comparatively high and the yield of solvent recovery would also suffer, while too high a vacuum should result in an inadequate partial pressure of the desired distillate, which necessitates an increase in the amount of the solvent vapor with respect to the XDI. This entails a waste of heat. The process of this invention can be carried out satisfactorily at the temperature of 185° C. or less, and this temperature range has little or no adverse effect on the thermal stability of XDI. It is also possible to carry out the desired distillation in the presence of a polymerization inhibitor in order to prevent the XDI from polymerizing.

The reboiler (A) is preferably designed for an increased evaporation efficiency for XDI. So far as the present process is concerned, the vaporization of XDI in the reboiler (A) differs from what is known as boiling and, therefore, the efficiency of evaporation is of concern. As regards the fractional distillation column (B), any of the bubble cap column, porous-plate column, tunnel cap tray, ballast tray, flexi tray, jet tray and various packed columns, which are adaptable to vacuum distillation, can be successfully employed.

The reflux condenser (C), where the desired product has a lower partial pressure and a depressed boiling point, is preferably operated at a lower temperature compared with the case in which no solvent is present, and its heat transfer area is also preferably sufficiently large. While infiltration of impurities into the solvent should be prevented as much as possible, it is likewise undesirable that the solvent makes its way into the impurities and is discarded. Thus, it is recommended to carry out the operation in a manner which satisfies the above two conditions.

In the following examples of the present invention, "parts" is shown by weight, unless otherwise stated.

EXAMPLE A 200 parts of phosgene dissolved into 200 parts of o-dichlorobenzene at −5° C. is mixed with 68 parts of a mixture of 70 parts of m-xylenediamine and 30 parts of p-xylenediamine dissolved in 400 parts of o-dichlorobenzene. The mixture is gradually heated to 170° C. for 2 hours while introducing an excess amount of phosgene to allow the reaction to take place. After the reaction, nitrogen gas is introduced into the resultant mixture to remove the excess phosgene. Then the solvent is distilled off from the thus treated resultant mixture to give crude XDI, which includes 3.5 parts of impurities and high-boiler. The crude XDI is subjected to a simple distillation under the conditions of 135° – 140° C./3 mm. Hg. to remove the high-boiler.

Thus treated crude XDI is fractionated following the system described in FIG.

The type of the used apparatus is as follows:

Fractionation Column (B): Sieve tray column having 40 trays (inner diameter: 180 mm. height: 4.4 m.);
Preheater (E): Falling film type;
Reboiler (A): Jacketted vessel with gas feed ring;
Heater (F): Plate fin type heater;
Partial Condenser (C): Shell and tube type;
Total Condenser (D): Shell and tube type. Ligroin is used as solvent. Ligroin is heated in heater up to 160° C. and led to a fractionation column through reboiler at a rate of 30,400 parts per hour. The crude XDI is heated at 160° C. in preheater and led to fractionation column at a rate of 10,000 parts per hour. The operating temperature is set by adjusting a temperature in the reboiler at 160° C. and the operating pressure is set by adjusting the pressure at the top of the column to 80 mm. Hg. The crude XDI is intercurrently contacted with the superheated gas of the solvent in the fractionation column. Impurities and the superheated gas are led to partial condenser through the top of the column, wherein only impurities are condensed, while the superheated gas is condensed in the total condenser and collected. The above-mentioned procedure is continuously conducted.

After about 20 hours, the fractionation system (reflux ratio, about 9.0) assumes a stationary state. XDI collected in reboiler is continuously led to the distillation apparatus at a rate of 9,000 to 10,000 parts per hour, wherein the XDI is subjected to distillation under conditions of 140° C./2–3 mm. Hg. to yield purified XDI in a yield of 95 weight percent of crude XDI fed to fractionation column.

The analysis of thus obtained pure XDI is as follows:

|  | Weight % |
|---|---|
| XDI | 99.5 |
| Hydrolyzable chlorine | 0.01 |
| Toluene insolubles | less than 0.02 |

After the stationary state is attained, the composition of the mixture in Reboiler (A) and that of the top of the Fractionation Column (B) are also analyzed to obtain the following result:

|  | XDI (weight %) | Chloromethylbenzylisocyanate (referred to as impurity (I)) (weight %) |
|---|---|---|
| Composition of the mixture in Reboiler (A) | 99.7 | 0.3 |
| Composition of the mixture at the top of Fractionation Column (B) | 35.0 | 65.0 |

EXAMPLE B

Crude XDI produced by the same procedure as in Example A is purified as follows:

The type of apparatus used is the same as in Example A except that a glass column (height: 2,000 mm., inner diameter: 50 mm.) packed with MacMahon made of stainless steel in place of the sieve tray column is used. As solvent, heptane is used. Heptane is heated in the heater at a temperature of 160° C. and led to fractionation column through the reboiler at a rate of 200 parts per hour. The operating temperature is set at 160° C. at the reboiler. The crude XDI (impurity (I) content about 2 percent) is heated at 160° C. in the preheater and led to the middle point of the fractionation column at a rate of 500 parts per hour. The operating temperature is set by adjusting the temperature in the reboiler to 160° C. and the operating pressure is set by adjusting the pressure at the top of the column to 30 mm. Hg. Intercurrent contact of the crude XDI with superheated heptane gas in the column is continuously continued for several hours at a reflux ratio of 7.0 and under such temperature and pressure as mentioned above.

Then purified XDI is obtained in a yield of 94 weight percent of the crude XDI fed to column after a similar manner to Example A.

The analysis of thus obtained pure XDI is as follows:

|  | Weight % |
|---|---|
| XDI | 99.5 |
| Hydrolyzable chlorine | 0.02 |
| Toluene insolubles | less than 0.02 |

In the above procedure, after the stationary state is reached, the composition of the reboiler and that of the top of the fractionation column are also analyzed to obtain the following result:

|  | XDI (weight %) | Chloromethylbenzylisocyanate (referred to as impurity (I)) (weight %) |
|---|---|---|
| Composition of the mixture in Reboiler (A) | 99.8 | 0.2 |
| Composition of the mixture at the top of the Fractionation Column (B) | 40.0 | 60.0 |

EXAMPLE C

A purification of Crude XDI is conducted in a batch-wise by the use of the following apparatus:

A glass column (inner diameter: 25 mm., height: 700 mm.) packed with one-quarter inch stainless MacMahon being vertically connected with 500 ml. flask which is equipped with inlet of crude XDI and that of superheated gas; the top of the glass column being jointed to partial condenser and total condenser in this order; and the inlet of superheated gas being connected with another flast for vaporizing solvent.

Into the 500 ml. flask, 500 parts of crude XDI containing about 2 parts of impurity (I) is charged. The fractionation is carried out under such conditions as operating pressure being 30 mm. Hg at the top of the column and the operating temperature being 165° C. at the bottom of the column and with blowing superheated vapor of xylene into the 500 ml. flask at a rate of 0.68 mole per hour through a pipe from the flask for vaporizing solvent. During the fractionation, the xylene is throughly condensed at the total condenser cooled at −20° C. and XDI condensed at the partial condenser is refluxed throughly. After 5 hours, the sample is collected at the same time from the top of column and flask. Thus obtained samples are analyzed by gas chromatography of which result is as follows:

|  | XDI (weight %) | Impurity (I) (weight %) |
|---|---|---|
| Composition of the mixture of flask | 99.8 | 0.2 |
| Composition of the mixture at the top of column | 60.0 | 40.0 |

EXAMPLE D

A purification of crude XDI containing 2 parts of impurity (I) is carried out by the use of the same apparatus as in Example C under the following conditions.

The result is as follows:

RESULT

| Solvent | Feed rate of solvent (mole) | Pressure at the top of column (mm. Hg) | Temperature (° C.) Bottom of column | Temperature (° C.) Partial condenser | Temperature (° C.) Total condenser | Composition of the mixture Flask CBI* | Composition of the mixture Flask XDI | Composition of the mixture Top of column CBI* | Composition of the mixture Top of column XDI |
|---|---|---|---|---|---|---|---|---|---|
| Benzene | 0.98 | 25 | 163 | 10 | −20 | 0.3 | 99.7 | 30.2 | 69.8 |
| Toluene | 0.68 | 20 | 165 | 30 | −20 | 0.2 | 99.8 | 32.5 | 67.5 |
| Ethylbenzene | 1.28 | 30 | 164 | 55 | −20 | 0.3 | 99.3 | 33.0 | 67.0 |
| Chlorobenzene | 0.68 | 20 | 165 | 45 | −20 | 0.3 | 99.7 | 31.0 | 69.0 |
| 1,2-dichlorobenzene | 0.73 | 20 | 163 | 10 | −20 | 0.2 | 99.8 | 31.6 | 68.4 |
| Dichloromethane | 0.62 | 20 | 165 | 0 | −20 | 0.3 | 99.7 | 31.7 | 68.3 |
| 1-chloro-n-butane | 0.65 | 20 | 163 | 15 | −20 | 0.2 | 99.8 | 35.6 | 64.4 |
| 1-chloro-n-pentane | 0.63 | 20 | 165 | 20 | −20 | 0.2 | 99.8 | 37.1 | 62.9 |
| 1-chloro-n-hexane | 0.96 | 25 | 165 | 50 | −20 | 0.2 | 99.8 | 36.5 | 63.5 |
| Chloroform | 0.63 | 20 | 165 | 10 | −20 | 0.3 | 99.7 | 31.3 | 68.7 |
| Carbon tetrachloride | 1.31 | 30 | 163 | 10 | −20 | 0.3 | 99.7 | 30.6 | 69.4 |
| n-Pentane | 1.42 | 30 | 165 | 0 | −20 | 0.3 | 99.7 | 31.1 | 68.9 |
| n-Hexane | 1.30 | 30 | 164 | 0 | −20 | 0.2 | 99.8 | 42.1 | 57.9 |
| n-Heptane | 1.01 | 25 | 164 | 15 | −20 | 0.3 | 99.7 | 33.6 | 66.4 |
| n-Octane | 1.33 | 30 | 162 | 45 | −20 | 0.3 | 99.7 | 31.1 | 68.9 |
| Ligroin | 0.71 | 25 | 164 | 40 | −20 | 0.2 | 99.8 | 44.2 | 55.8 |
| Cyclohexane | 0.82 | 20 | 164 | 10 | −20 | 0.2 | 99.8 | 40.0 | 60.0 |
| Cyclopentane | 0.82 | 23 | 165 | 25 | −20 | 0.3 | 99.7 | 31.3 | 68.7 |
| Cyclooctane | 0.52 | 15 | 163 | 50 | −20 | 0.3 | 99.7 | 30.9 | 69.1 |
| Methylcyclohexane | 0.65 | 20 | 164 | 15 | −20 | 0.3 | 99.7 | 36.3 | 63.7 |

*CBI: Chloromethylbenzylisocyanate (referred to as impurity (I)).

EXAMPLE E

N-hexane is used as a solvent. As a fractionating column, there is used a porous-plate column being made of stainless steel and having the inside diameter of 180 mm., length of 4.4 m. and 40 plates.

This porous-plate column is connected with a kettle type evaporator (reboiler) equipped with a gas inlet nozzle, a tubular partial condenser and a tubular total condenser as illustrated in FIG. 2.

The tubular partial condenser is cooled by cycling water of 10° C. or lower, while the total condenser is cooled by brine. On the other hand, the reboiler is heated by high-pressure steam. The total condenser is further connected with a vacuum pump through a cold trap. Another kettle type evaporator (with a jacket) is connected with the total condenser in such a manner that solvent condensed in the total condenser can continuously be fed into the evaporator. Vaporized solvent from the evaporator is led to the gas inlet nozzle of the reboiler through a reducing bulb and a double pipe preheater.

The starting material is fed at the middle part of the fractionating column through the double pipe preheater. The partial condenser is connected with a reflux controller so that a condensate can be taken out of the condenser at a constant reflux ratio. The kettle type reboiler is so constructed that a content in the reboiler can be overflown. Thus, a high boiler is overflown from the reboiler into a vacuum receiver. The fractionating column is not only traced with an electric heater so as to minimize heat loss but also sufficiently kept warm.

The operation is carried out under the conditions as mentioned below:

The pressure at the top of the fractionating column is adjusted to 75 mm. Hg, while the temperature at the bottom of the column (at the reboiler) is adjusted to 175° C. The column is traced with an electric heater so as to inhibit lowering of an inner temperature (the inner temperature at the middle part of the column is maintained at 170° C.). N-hexane vapor is preheated at 170° C. and adjusted to be fed into the reboiler at a feed rate of 34 Kg./hr.

The starting material, a crude XDI containing 2 percent of chloromethyl-benzyl-isocyanate (CBI) but containing no polymer, is preheated at 170° C. and fed into the column at a feed rate of 7.5 Kg./hr. At first, the fractionation is carried out under total reflux, and when CBI content at the top of the column becomes 80 percent, the fractionated product begins to be taken out while the CBI content at the top of the column is inhibited from lowering (reflux ratio is calculated as 20 to 25 percent). The fractionation is further continued under a stationary state while the afore-mentioned taking out of the fractionated product is conducted.

Compositions of the column top products and of the reboiler are analyzed to find out the following result.

|  | XDI (%) | CBI (%) | Polymer (%) |
|---|---|---|---|
| Column top | 18 | 82 | 0 |
| Reboiler | 94.9 | 0.1 | 5 |

Though gas chromatography analysis of the column top products reveals several peaks due to low boiling impurities other than a peak for CBI, these impurities are calculated as CBI. On the other hand, residue obtained upon a complete distillation is referred to as the polymer.

The final product is yielded by distillation of the reboiler in a yield of 92 percent relative to the crude XDI used.

EXAMPLE F

By the use of the same apparatus as in Example E and of n-hexane, an experiment is carried out under the conditions as mentioned below:

The pressure at the top of the fractionating column is adjusted to 75 mm. Hg, while the temperature at the bottom of the column (temperature at the reboiler) is adjusted to 175° C. The column is traced with an electric heater so as to maintain the inner temperature at the middle part of the column at 185° C. N-hexane vapor is preheated at 170° C. and adjusted to be fed into the reboiler at a feed rate of 18 Kg./hr.

The starting material, a crude XDI containing 2 percent of chloromethyl-benzyl-isocyanate (CBI) but containing no polymer, is preheated at 170° C. and fed into the column at a feed rate of 7.5 Kg./hr. At first, the fractionation is carried out under total reflux, and when CBI content at the top of the column becomes 80 percent, the fractionated product begins to be taken out while the CBI content at the top of the column is inhibited from lowering (reflux ratio is calculated as 30 percent). The fractionation is further continued under a stationary state while the afore-mentioned taking out of the fractionated product is conducted.

Compositions of the column top products and of the reboiler are analyzed to find out the following result:

|  | XDI(%) | CBI (%) | Polymer (%) |
|---|---|---|---|
| Column top | 18.5 | 81.5 | 0 |
| Reboiler | 93.4 | 0.1 | 6.5 |

The final product is yielded by distillation of the reboiler in a yield of 90 percent relative to the crude XDI used.

EXAMPLE G

An experiment is conducted by the use of the same solvent and apparatus as in the Examples E and F, excepting for using a tubular reboiler in place of a kettle type evaporator in order to avoid lowering of yield caused by a lengthy evaporating time.

Vaporized solvent is allowed to blow in from the bottom of the reboiler. The reboiler is heated by heat transfer medium (SK-oil No. 260 made by Soken Chemical Co.).

The operation is carried out under the conditions as mentioned below:

The pressure at the top of the fractionating column is adjusted to 75 mm. Hg, while the temperature at the bottom of the column (at the reboiler) is adjusted to 185° C. The column is traced with an electric heater so as to maintain the inner temperature at the middle part of the column at 175° C. N-hexane vapor is preheated at 170° C. and adjusted to be fed into the reboiler at a feed rate of 25 Kg./hr.

The starting material, a crude XDI containing 2 percent of chloro-methyl-benzyl-isocyanate (CBI) but containing no polymer, is preheated at 170° C. and fed into the column at a feed rate of 7.5 Kg./hr. At first, the fractionation is carried out under total reflux, and when CBI content at the top of the column becomes 80 percent, the fractionated product begins to be taken out while the CBI content at the top of the column is inhibited from lowering (reflux ratio is calculated as 25 percent). The fractionation is further continued under a stationary state while the afore-mentioned taking out of the fractionated product is conducted.

Compositions of the column top products and of the reboiler are analyzed to find out the following result:

|  | XDI (%) | CBI (%) | Polymer (%) |
|---|---|---|---|
| Column top | 17 | 83 | 0 |
| Reboiler | 95.4 | 0.1 | 4.5 |

The final product is yielded by distillation of the reboiler in a yield of 92 percent relative to the crude XDI used.

What is claimed is:

1. A method for the purification of crude xylylenediisocyanate prepared by phosgenation of the corresponding polyamine, which comprises bringing the crude xylylenediisocyanate into contact with an inert gas in a fractionation column, under such conditions that the pressure at the top of the column is from 10 to 150 mm. Hg., the temperature at the bottom of the column is from 100° to 185° C and the ratio of the feed rate of inert gas relative to feed rate of crude xylylenediisocyanate is from 0.2 to 3.0 by weight and thereafter recovering purified xylylenediisocyanate from the base of said column.

2. A method as in claim 1, wherein the inert gas is nitrogen gas.

3. A method for the purification of crude xylylenediisocyanate which comprises contacting crude xylylenediisocyanate with the superheated vapor of an organic solvent having a boiling point of −20° to 150° C. at a pressure of 200 mm. Hg, in a fractionation column under a pressure at the top of the column of 5 to 200 mm. Hg, and a temperature at the bottom of the column of not higher than 185° C. and thereafter recovering purified xylylenediisocyanate from the base of said column.

4. A method according to claim 3 wherein the organic solvent is selected from the class consisting of aliphatic hydrocarbons having two to 11 carbon atoms, alicyclic hydrocarbons having five to eight carbon atoms, aromatic hydrocarbons, halo-genated aliphatic hydrocarbons having one to six carbon atoms and halogenated benzenes.

* * * * *